Patented Dec. 28, 1937

2,103,429

UNITED STATES PATENT OFFICE 2,103,429

METHOD FOR DEHYDRATING PINE OIL

Robert W. Martin, Wilmington, Del., assignor to Hercules Powder Company, Wilmington, Del., a corporation of Delaware No Drawing. Application January 18, 1935,
Serial No. 2,401

9 Claims. (Cl. 260—167)

This invention relates to a method for dehydrating pine oil and more particularly for dehydrating terpene alcohols contained in pine oil.

Heretofore for the dehydration of the terpene alcohols contained in pine oil, which, as is well known, is a mixture of terpenes generally obtained by steam distillation or by solvent extraction from pine stump wood and boiling from about 190° C. to about 230° C., with the formation of terpene hydrocarbons and water, it has been customary to utilize a surface catalyst such as clay, fuller's earth, silica gel, or the like, or to use an acid, a bisulphate, iodine, etc. The procedure for the dehydration of pine oil as heretofore followed involved heating pine oil in the presence of a catalyst or of an acid, etc.

The prior practice has been effective to accomplish desired dehydration, but has been recognized as disadvantageous for various reasons, among which are that the materials used as catalysts not only render the dehydration of the terpene alcohols practical, but they also polymerize the hydrocarbons, thus forming high boiling material, and that the catalyst involves an item of cost and requires effort for its separation on completion of the reaction.

Now, in accordance with this invention, it has been found that the terpene alcohols, including tertiary alcohols, chiefly terpineol and secondary alcohols, chiefly fenchyl alcohol and borneol, as present in pine oil, can be dehydrated by heating under pressure in the presence of water. The dedration is carried out with the pine oil and water in liquid phase.

Further, in accordance with this invention, it has been found that the secondary and tertiary terpene alcohol content of pine oil can be selectively dehydrated. That is to say, if desired, the tertiary alcohols as present in pine oil in admixture with hydrocarbons and secondary alcohols can be dehydrated without dehydration of the secondary alcohols. At the same time, in accordance with this invention the secondary terpene alcohols as present in pine oil in admixture with the usual components thereof can be substantially dehydrated along with the tertiary alcohols.

In proceeding in accordance with this invention for the practical dehydration of the terpene alcohols contained in pine oil, any suitable form of apparatus such as is capable of containing pine oil and water in admixture, is susceptible to necessary heating and will retain the necessary pressure, may be used. Thus, for example, the method in accordance with this invention may be readily carried out in a pressure tube or other suitable form of apparatus. The method in accordance with this invention lends itself to continuous procedure. For carrying out the method continuously any suitable apparatus may be used, such, for example, as a series of vertical pressure tubes containing plates for distribution of the liquid, through which pine oil and water having been suitably preheated, are circulated concurrently or counter-currently for the time necessary to effect the desired dehydration.

As will be obvious, the pine oil after treatment in accordance with this invention for dehydration of the tertiary alcohols or both tertiary and secondary alcohols, may be fractionated for the separation of its components, including the products of dehydration of the alcohols, such as dipentene, terpinene and terpinolene, formed by the dehydration of tertiary alcohols, and such as fenchene and bornylene formed from the dehydration of secondary alcohol.

In general, the method in accordance with this invention will involve heating pine oil and water to a temperature above the normal boiling point of water (100° C.) and under a pressure such as to maintain the pine oil and water in liquid phase at the temperature used.

More particularly, for the dehydration of the tertiary alcohol content of pine oil, pine oil and water will preferably be heated to a temperature of about 243° C.–275° C. and under a pressure of about 500 pounds to about 900 pounds. Lower pressure and temperature may be used. In proceeding under a pressure of below about 900 pounds (275° C.) the secondary alcohol content of the pine oil will not be largely altered, however, with increase of the pressure above 900 pounds and preferably as high as 2,000 pounds (335° C.) or higher, about 80% of the secondary alcohol content of the pine oil will be dehydrated, and at the same time, of course, the tertiary alcohol content will be dehydrated. Equal parts of water and pine oil will be efficient.

As more specifically illustrative of the method in accordance with this invention, for example, equal parts of pine oil and water are heated in a pressure tube at a temperature of about 243° C.–275° C. under a pressure of about 500–900 pounds, for about one-half hour. Desirably during the heating period the pine oil and water will be agitated sufficiently to keep them well mixed.

The result of the treatment will be to effect dehydration of the tertiary alcohol content of the pine oil without, at the same time, substantially altering the secondary alcohol content of the pine oil. On completion of the treatment the treated pine oil may be fractionated in any well known and usual manner to effect separation of the several components, including the products of dehydration of the tertiary alcohols, or such of the components and/or products as may be desired.

As further illustrative of the method in accordance with this invention, for example, equal parts of pine oil and water are mixed and placed in a pressure tube equipped with mechanism for agitating the mixture. The mixture of pine oil and water is then subjected to a temperature of about 335° C. under a pressure of 2000 pounds for a period of about one hour. On completion of the treatment the tertiary alcohol content of the alcohol will have been largely dehydrated and about 80% of the secondary alcohol content will also have been dehydrated. After the treatment the treated pine oil may be fractionated for the separation of desired products including products of dehydration of the tertiary and secondary terpene alcohols.

By the method in accordance with this invention the tertiary and secondary alcohols contained in pine oil may be effectively and very inexpensively dehydrated. The treatment will not cause any objectionable polymerization of the hydrocarbons contained in the pine oil and as a consequence no substantial amount of high boiling substance will be formed. The method will also be distinctly advantageous in that since no catalyst or catalytic material is used the cost of such material is saved and, at the same time, the cost and trouble of removing a catalyst or catalytic material, as by filtration or chemical treatment, is obviated.

It will be understood that the method in accordance with this invention may be carried out at temperatures and corresponding pressures within the range above the normal boiling point of water (100° C.) to below the critical pressure and temperature of water (3226 lbs., 374° C.) and that particularly temperature and pressure used will be dictated by whether it is desired to dehydrate only the tertiary alcohols or to dehydrate both the secondary and tertiary alcohols.

What I claim and desire to protect by Letters Patent is:

1. The method for the dehydration of a terpene alcohol contained in pine oil, which comprises subjecting water and pine oil containing terpene alcohol to a temperature above the normal boiling point of water and under a pressure such that the pine oil and water will remain in liquid phase at the temperature used.

2. The method for dehydrating the terpene alcohols contained in admixture in pine oil, which comprises subjecting water and pine oil containing terpene alcohols to a temperature above the normal boiling point of water and under a pressure such that the pine oil containing said terpene alcohols and the water will remain in liquid phase at the temperature used.

3. The method for dehydrating a tertiary terpene alcohol contained in pine oil, which comprises heating said pine oil and water to a temperature of about 243° C.–275° C. under a pressure of about 500 pounds to about 900 pounds.

4. The method for dehydrating a terpene alcohol contained in pine oil, which comprises heating said pine oil and water to a temperature of about 243° C.–335° C. under a pressure of about 500 pounds to about 2000 pounds.

5. The method for dehydrating a terpene alcohol contained in pine oil, which comprises heating said pine oil and water to a temperature of about 275° C.–335° C. under a pressure of about 900 pounds to about 2000 pounds.

6. The method of dehydrating secondary terpene alcohol contained in pine oil, which comprises heating said pine oil and water to a temperature of from above about 275° C. to about 335° C. under a pressure above about 900 pounds to about 2000 pounds.

7. The method for the dehydration of a terpene alcohol contained in pine oil, which comprises subjecting water and a pine oil containing a terpene alcohol to a temperature within the range of 100° C.–374° C. and under a pressure such that the pine oil and the water will remain in liquid phase at the temperature used.

8. The method for the dehydration of a terpene alcohol contained in pine oil, which comprises subjecting water and a pine oil containing a terpene alcohol to countercurrent flow at a temperature within the range of 100° C.–374° C. and under a pressure such that the pine oil and the water will remain in the liquid phase at the temperature used.

9. The method for the dehydration of a terpene alcohol contained in pine oil, which comprises subjecting water and a pine oil containing a terpene alcohol to con-current flow at a temperature within the range of 100° C.–374° C. and under a pressure such that the pine oil and the water will remain in the liquid phase at the temperature used.

ROBERT W. MARTIN.

CERTIFICATE OF CORRECTION.

Patent No. 2,103,429. December 28, 1937.

ROBERT W. MARTIN.

It is hereby certified that error appears in the printed specification of the above numbered patent requiring correction as follows: Page 2, first column, line 53, claim 1, after the word "oil" insert containing said terpene alcohol; and same line and claim, after "and" insert the; and that the said Letters Patent should be read with these corrections therein that the same may conform to the record of the case in the Patent Office.

Signed and sealed this 25th day of January, A. D. 1938.

Henry Van Arsdale,
Acting Commissioner of Patents.

(Seal)